(12) United States Patent
Ishibe

(10) Patent No.: US 12,687,993 B2
(45) Date of Patent: Jul. 21, 2026

(54) INFORMATION PROCESSING SYSTEM AND INFORMATION PROCESSING APPARATUS

(71) Applicant: FUJIFILM Business Innovation Corp., Tokyo (JP)

(72) Inventor: Mitsuhiro Ishibe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/311,937

(22) Filed: May 4, 2023

(65) Prior Publication Data

US 2024/0143254 A1     May 2, 2024

(30) Foreign Application Priority Data

Oct. 28, 2022     (JP) ................................. 2022-173646

(51) Int. Cl.
*G06F 3/12*          (2006.01)
*H04N 1/60*          (2006.01)
(52) U.S. Cl.
CPC .......... *G06F 3/1261* (2013.01); *G06F 3/1208* (2013.01); *H04N 1/6033* (2013.01)
(58) Field of Classification Search
CPC .... G06F 3/1261; G06F 3/1208; H04N 1/6033
See application file for complete search history.

(56) References Cited

U.S. PATENT DOCUMENTS

| | | | | |
|---|---|---|---|---|
| 2015/0213337 A1* | 7/2015 | Yasui | ................... | G06K 15/027 |
| | | | | 358/1.9 |
| 2017/0118382 A1* | 4/2017 | Sugita | .................. | H04N 1/6055 |
| 2017/0318195 A1* | 11/2017 | Yamamoto | ......... | H04N 1/00015 |

FOREIGN PATENT DOCUMENTS

| | | |
|---|---|---|
| JP | 2009-037405 A | 2/2009 |
| JP | 2018-093377 A | 6/2018 |

\* cited by examiner

*Primary Examiner* — John R Wallace
(74) *Attorney, Agent, or Firm* — Oliff PLC

(57)     ABSTRACT

An information processing system includes an information processing apparatus and multiple printers, the printers including a first printer and a printer group including at least one printer, the information processing apparatus including a processor configured to: acquire as a first measurement value a measurement value of color of a first print product that the first printer has printed in response to a first print instruction; acquire as a second measurement value a measurement value of color of the first print product that a second printer included in the printer group has printed in response to the first print instruction; and transmit to the second printer a first difference between the first measurement value and the second measurement value. Using a set value calculated in accordance with the first difference, the second printer prints a second print product in response to a second print instruction that applies settings calculated based on the first difference.

9 Claims, 13 Drawing Sheets

FIG. 5

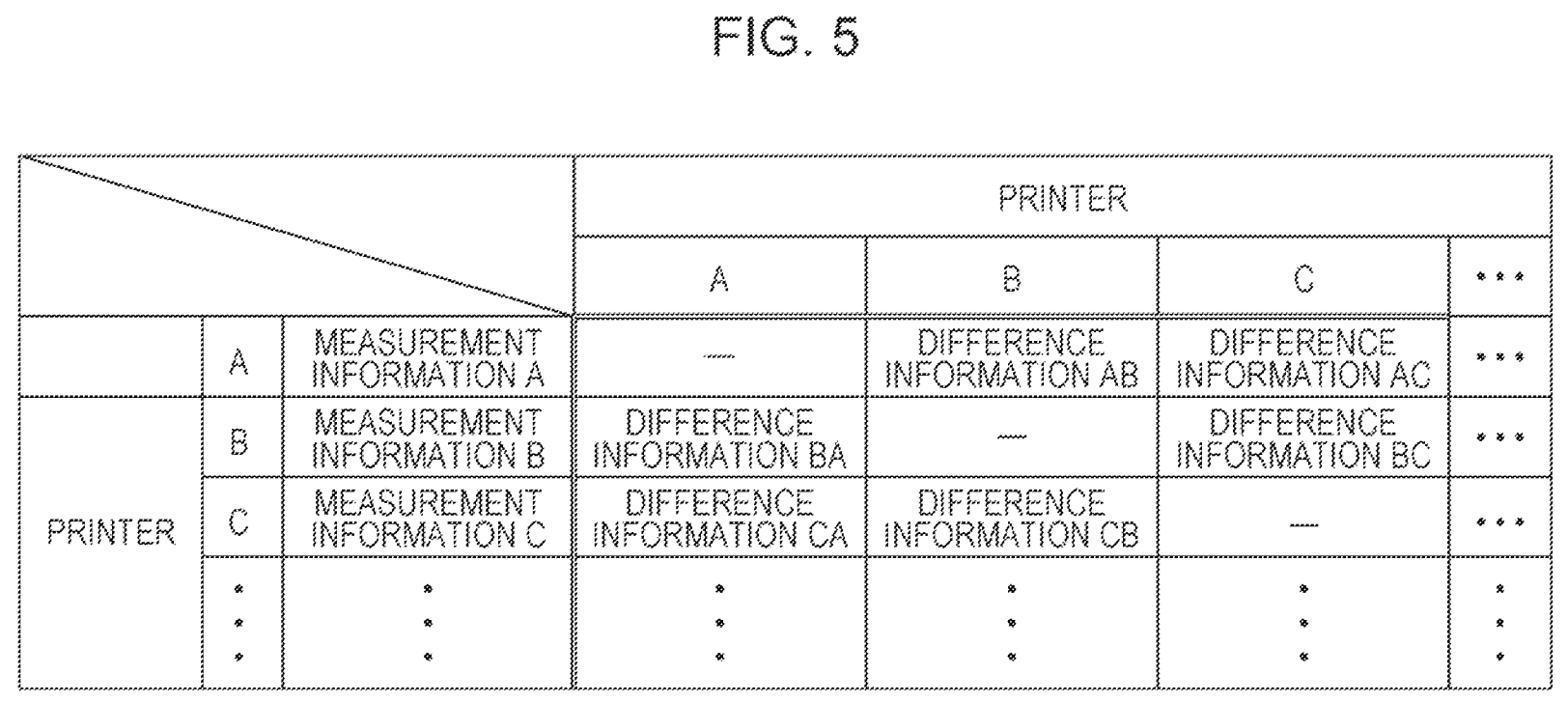

| PRINTER | | A | B | C | ... |
|---|---|---|---|---|---|
| | A | — | DIFFERENCE INFORMATION AB | DIFFERENCE INFORMATION AC | ... |
| | B | DIFFERENCE INFORMATION BA | — | DIFFERENCE INFORMATION BC | ... |
| | C | DIFFERENCE INFORMATION CA | DIFFERENCE INFORMATION CB | — | ... |
| | ... | ... | ... | ... | ... |

| PRINTER | |
|---|---|
| A | MEASUREMENT INFORMATION A |
| B | MEASUREMENT INFORMATION B |
| C | MEASUREMENT INFORMATION C |
| ... | ... |

AS SECOND PRINTER, SELECT ONE FROM
LISTED PRESENTATION CANDIDATES

| PRESENTATION CANDIDATES | SECOND DIFFERENCE |
|---|---|
| PRINTER A | 10 |
| PRINTER B | 20 |
| PRINTER C | 25 |
| PRINTER C | 28 |

1

INFORMATION PROCESSING SYSTEM AND INFORMATION PROCESSING APPARATUS

CROSS-REFERENCE TO RELATED APPLICATIONS

This application is based on and claims priority under 35 USC 119 from Japanese Patent Application No. 2022-173646 filed Oct. 28, 2022.

BACKGROUND

(i) Technical Field

The present disclosure relates to an information processing system and an information processing apparatus.

(ii) Related Art

Japanese Unexamined Patent Application Publication No. 2009-037405 discloses an information processing apparatus that works with multiple color printers and multiple personal computers (PCs) present over a network. The information processing apparatus includes a unit that allows multiple color printers to output color patches and causes a print operator managing each color printer to acquire colorimetric data from a colorimeter attached to each color printer. The information processing apparatus further includes a unit that transfers the colorimetric data to a color manager who centrally performs color management on the color printers over the network. The information processing apparatus further includes a unit that produces color profile data that is used by the color manager. The color manager uses the color profile data to match color reproduction states of the color printers in accordance with output characteristic information on the colorimetric data of the color printers transferred from the print operator. The information processing apparatus further includes a unit that produces favorites that are a set of data containing the produced color profile data and other color adjustment information. The information processing apparatus further incudes a unit that transfers the favorites from the color manager to a client PC that controls the color printer managed by each print operator.

Japanese Unexamined Patent Application Publication No. 2018-093377 discloses a color conversion control program running on an apparatus that performs color verification by causing a printer having a color management module (CMM) for color conversion to output a color verification chart. The color conversion control program causes the apparatus to perform a first process in which information on a printer serving as a sender from which the color verification chart is to be output is acquired and the CMM serving a sender is identified. The color conversion control program also causes the apparatus to perform a second process and a third process. If the CMM of a printer of interest is different from the CMM of the printer as the sender, the second process acquires an error in color conversion due to a difference between the CMMs. The third process sets an international color consortium (ICC) profile. The color conversion control program also causes the apparatus to perform a fourth process that performs color conversion on image data of the color verification chart using the CMM of the printer of interest in accordance with the set ICC profile. The color conversion control program further causes the apparatus to perform a fifth process that corrects an error in the color conversion on the image data of the converted color verification chart by using a pre-stored correction look-up table (LUT). The color conversion control program further causes the apparatus to perform a sixth process that transmits to the printer as the sender the image data of the color verification chart that has undergone the color conversion and the correction.

SUMMARY

Aspects of non-limiting embodiments of the present disclosure relate to providing an information processing system and an information processing apparatus that reduce a difference between a color of a print product that a first printer has printed in response to a print job and a color of a print product that a second printer has printed in response to the print job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including an information processing apparatus and multiple printers, the printers including a first printer and a printer group including at least one printer, the information processing apparatus including a processor configured to: acquire as a first measurement value a measurement value of a color of a first print product that the first printer has printed in response to a first print instruction; acquire as a second measurement value a measurement value of a color of the first print product that a second printer included in the printer group has printed in response to the first print instruction; and transmit to the second printer a first difference between the first measurement value and the second measurement value. Using a set value calculated in accordance with the first difference, the second printer prints a second print product in response to a second print instruction that applies settings calculated based on the first difference.

BRIEF DESCRIPTION OF THE DRAWINGS

Exemplary embodiments of the present disclosure will be described in detail based on the following figures, wherein:

FIG. 5 illustrates a structure example of a coordination database in accordance with the exemplary embodiments of the disclosure;

FIG. 8 illustrates a structure example of a candidate screen in accordance with the exemplary embodiments of the disclosure;

DETAILED DESCRIPTION

First Exemplary Embodiment

Figure 1:
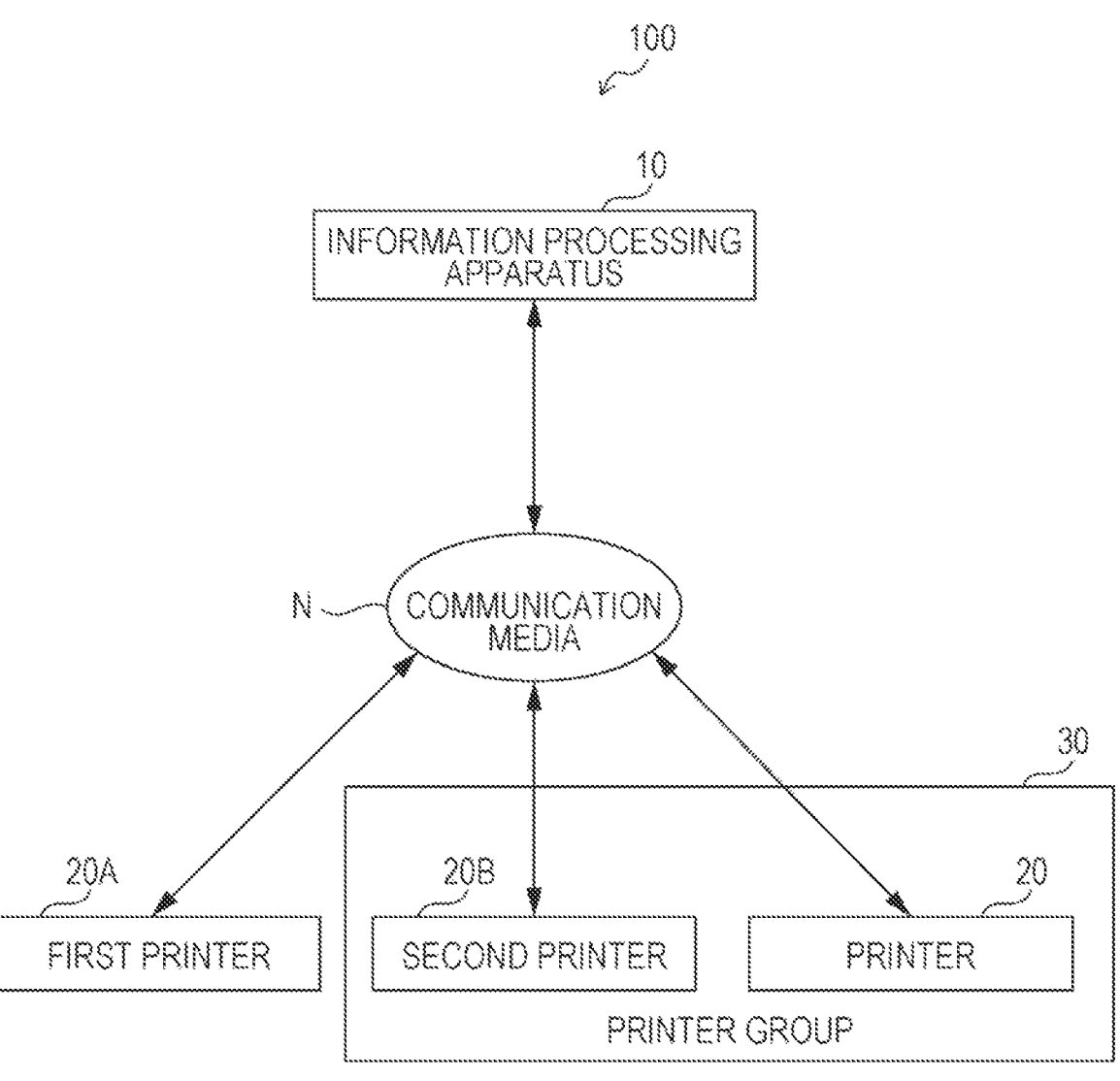
FIG. 1 illustrates a configuration of an information processing system of exemplary embodiments of the disclosure.

Exemplary embodiments of the disclosure are described below with reference to the drawings. In the drawings, identical or equivalent elements are designated with the same reference numerals. Dimensions of elements may be exaggerated and may not necessarily be to scale.

Referring to FIG. 1, an information processing system 100 of the exemplary embodiments includes an information processing apparatus 10 and multiple printers 20. The printers 20 include a first printer 20A and a printer group 30 including at least one printer. The printer group 30 includes a second printer 20B. In the following discussion, if the first printer 20A and second printer 20B are not differentiated from the printers 20 excluding the second printer 20B and included in the printer group 30, the first printer 20A and second printer 20B are simply referred to as printers 20. The number of printers 20 included in the information processing system 100 is not limited to the number of printers illustrated in FIG. 1.

The information processing apparatus 10 is communicably connected to each of the printers 20 via a communication medium N. According to the exemplary embodiments, the communication medium N may include an in-house communication network, such as a local-area network (LAN) or a wide-area network (WAN), or a combination of the in-house network and a public communication network. According to the exemplary embodiments, the communication medium N includes a wireless network. However, the communication medium N may include a wired network or a combination of the wireless network and the wired network.

Figure 2:
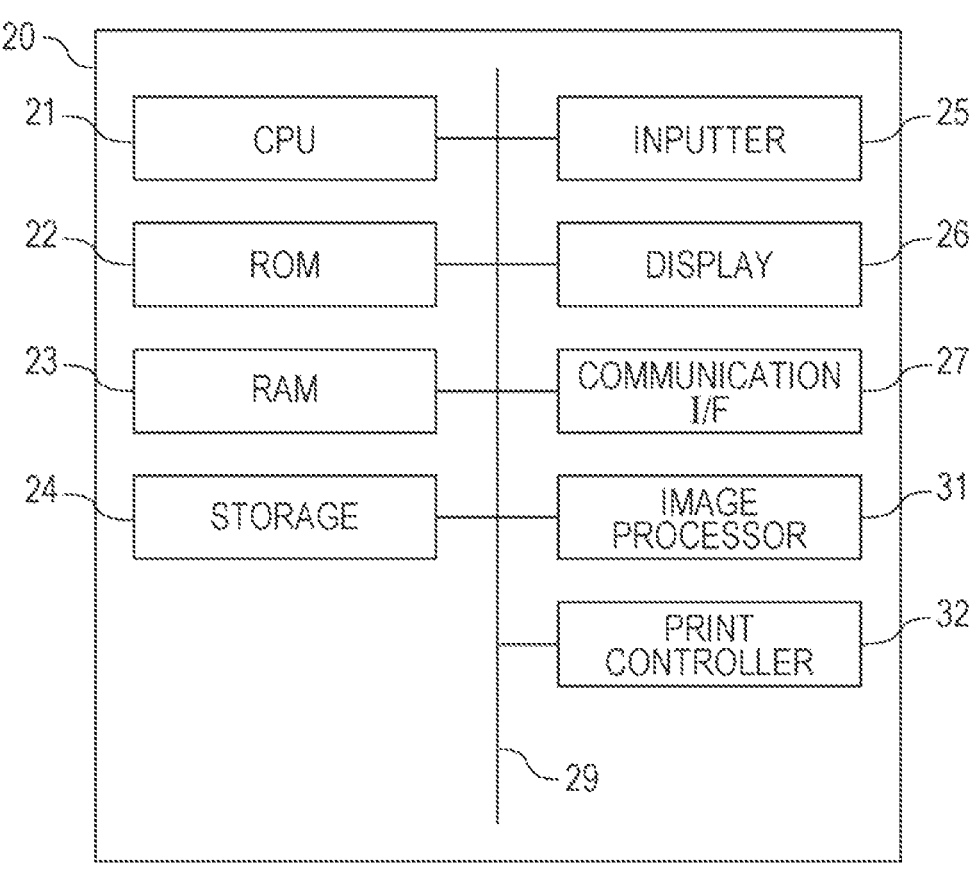
FIG. 2 is a block diagram illustrating a configuration example of a printer in accordance with the exemplary embodiments of the disclosure.

Referring to FIG. 2, the printer 20 includes a central processing unit (CPU) 21, read-only memory (ROM) 22, random-access memory (RAM) 23, storage 24, inputter 25, display 26, communication interface (I/F) 27, image processor 31, and print controller 32. These elements are communicably interconnected to each other via a bus 29.

The CPU 21 executes a variety of programs and controls the elements. The CPU 21 reads programs from the ROM 22 or storage 24, and executes the programs using the RAM 23 as a working area. The CPU 21 controls the elements and performs a variety of arithmetic operations in accordance with the programs stored on the ROM 22 or storage 24. According to the exemplary embodiments, a print processing program is stored on the ROM 22 or storage 24.

The ROM 22 stores a variety of programs and a variety of data. The RAM 23 serving as the working area temporarily stores a program or data. The storage 24 includes a hard disk drive (HDD) or a solid state drive (SSD), and stores a variety of programs including an operating system and a variety of data.

The inputter 25 includes a pointing device, such as a mouse, and a keyboard and is used to enter a variety of inputs.

The display 26 is a liquid-crystal display and displays a variety of information. The display 26 is a touch panel and may also serve as the inputter 25.

The communication OF 27 communicates with other apparatuses, such as the information processing apparatus 10 and supports standards, such Ethernet (registered trademark), fiber-distributed data interface (FDDI), or Wi-Fi (registered trademark).

The image processor 31 performs a variety of image processing processes. The print controller 32 performs a printing process of forming an image on a paper sheet, a detection process of detecting a paper sheet fed to a tray, a transport process of transporting the paper sheet, and other processes.

Figure 3:
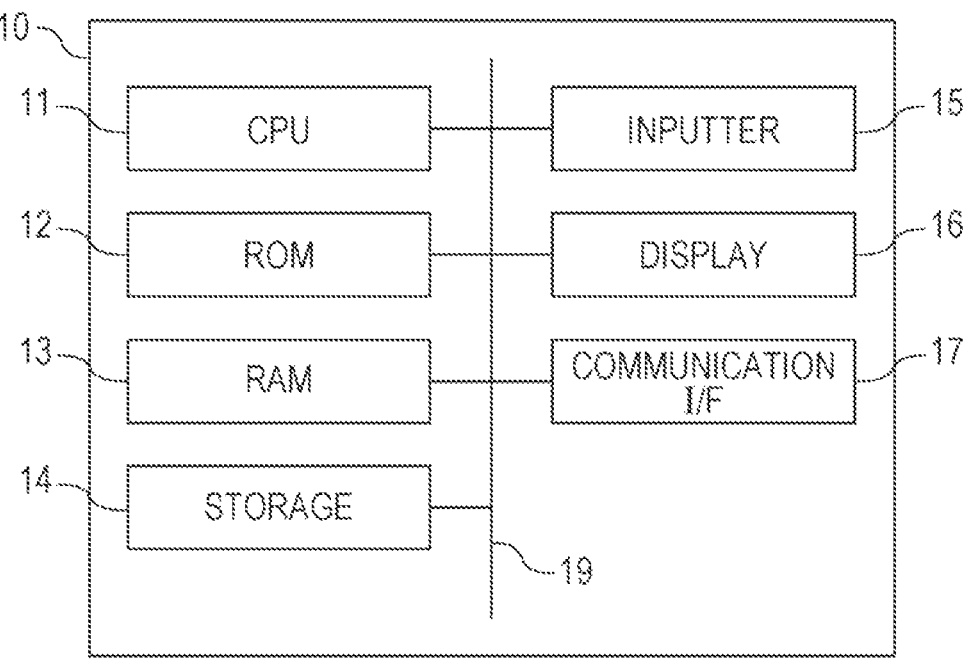
FIG. 3 is a block diagram illustrating a configuration example of an information processing apparatus in accordance with the exemplary embodiments of the disclosure.

Referring to FIG. 3, the information processing apparatus 10 includes a CPU 11, ROM 12, RAM 13, storage 14, inputter 15, display 16, and communication OF 17. These elements are communicably interconnected to each other via a bus 19.

According to the exemplary embodiments, a server may be used as an example of the information processing apparatus 10. The disclosure is not limited to the server. In place of the server, a personal computer may be used as the information processing apparatus 10.

The CPU 11 executes a variety of programs and controls the elements. Specifically, the CPU 11 reads a program from the ROM 12 or storage 14 and executes the read program using the RAM 13. In accordance with programs stored on the ROM 12 or storage 14, the CPU 11 controls the elements and performs a variety of arithmetic operations. According to the exemplary embodiments, an information processing program is stored on the ROM 12 or storage 14.

The ROM 12 stores a variety of programs and a variety of data. The RAM 13 temporarily stores a program or data. The storage 14 includes a HDD or SSD and stores a variety of programs including an operating system and a variety of data.

The inputter 15 includes a pointing device, such as a mouse, and a keyboard and is used to enter a variety of inputs.

The display 16 is a liquid-crystal display and displays a variety of information. The display 16 is a touch panel and may also serve as the inputter 15.

The communication OF 17 communicates with other apparatuses, such as the printer 20 and supports standards, such Ethernet (registered trademark), FDDI, or Wi-Fi (registered trademark).

The processes of the information processing system 100 are described below.

Figure 4:
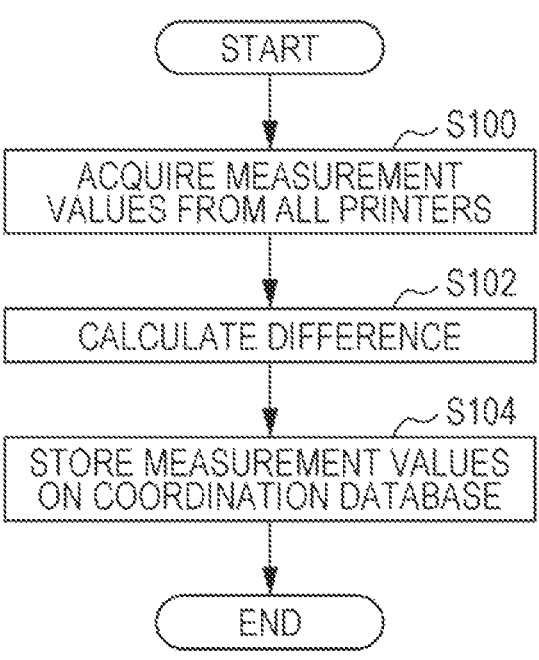
FIG. 4 is a flowchart illustrating a flow example of a memory process in accordance with the exemplary embodiments of the disclosure.

FIG. 4 is a flowchart illustrating a flow example of a memory process performed by the information processing apparatus 10. The CPU 11 performs the memory process by reading the information processing program from the ROM 12 or the storage 14, loading the information processing program onto the RAM 13, and executing the read information processing program.

In step S100 in FIG. 4, the CPU 11 acquires, from all the printers 20 included in the information processing system 100, measurement values of color of a first print product printed in response to a first print instruction. A measurement process that the printer 20 performs to acquire a measurement value is described below. The measurement values include information related to an average color difference of the first color product, maximum color difference of the first print product, and L* mean, a* mean, and b* mean of the first color product in an L*a*b* color space, and color reproducibility of cyan, magenta, yellow, and key (CMYK).

In step S102, the CPU 11 calculates a difference between measurement values acquired in step S100. The difference includes information related to the average color difference of the first color product, maximum color difference of the first print product, and L* mean, a* mean, and b* mean of the first color product in the L*a*b* color space, and color reproducibility of CMYK.

In step S104, the CPU 11 stores, on a cooperation database, the measurement values of colors of the first print product acquired in step S100, differences calculated in step S102, date and time of execution in step S104, and then ends the memory process.

Referring to FIG. 5, the cooperation database stores measurement information on each printer 20, and difference information between the printers 20. The measurement information includes the measurement values of the colors of the first print product (namely, the measurement values acquired in step S100 of the memory process) and the date and time of update. The difference information includes a difference between the measurement values of the colors of the first print product (namely, the difference calculated in step S102), and the date and time of update. Referring to FIG. 5, measurement information A is stored as the measurement information on a printer A. Referring to FIG. 5, as well, difference information AB is stored as the difference information on the printer A and printer B.

Figure 6:
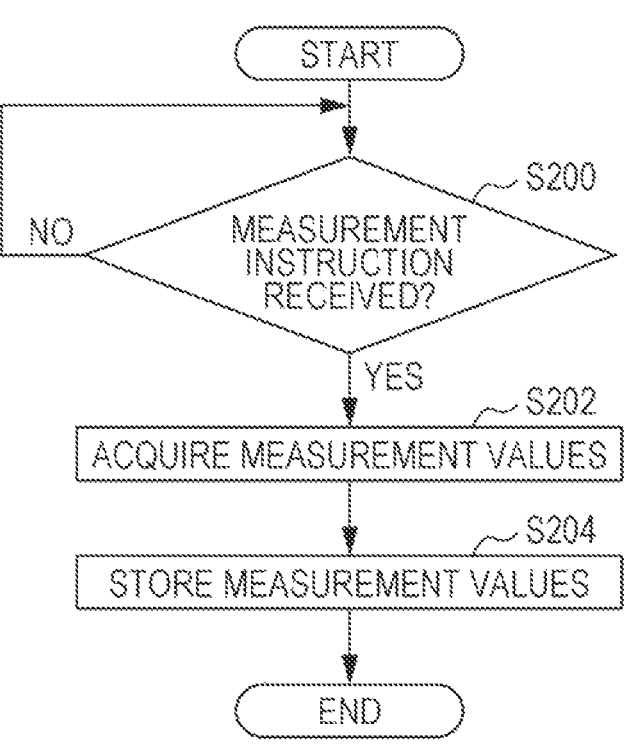
FIG. 6 is a flowchart illustrating a flow example of a measurement process in accordance with the exemplary embodiments of the disclosure.

FIG. 6 is a flowchart illustrating a flow example of a measurement process performed by the printer 20. The CPU 21 performs the measurement process by reading a print processing program from the ROM 22 or the storage 24 and loading the print processing program onto the RAM 23.

In step S200 in FIG. 6, the CPU 21 waits on standby until an instruction to measure the color of the first print product to acquire the measurement value is received. If the instruction to measure the color of the first print product to acquire the measurement value is received (yes path in step S200), the CPU 21 proceeds to step S202.

In step S202, the CPU 21 acquires the measurement value of the color of the first print product. Specifically, the CPU 21 acquires the measurement value of the color of the first print product when an inline sensor in the printer 20 irradiates the first print product with light and receives light reflected from the first print product.

In step S204, the CPU 21 stores the measurement values of the colors of the first print product acquired in step S202 onto the ROM 12 or the storage 14 in the printer 20 and then ends the measurement process. The measurement values of the colors of the first print product may be measured by a colorimeter different from the printer 20.

Figure 7:
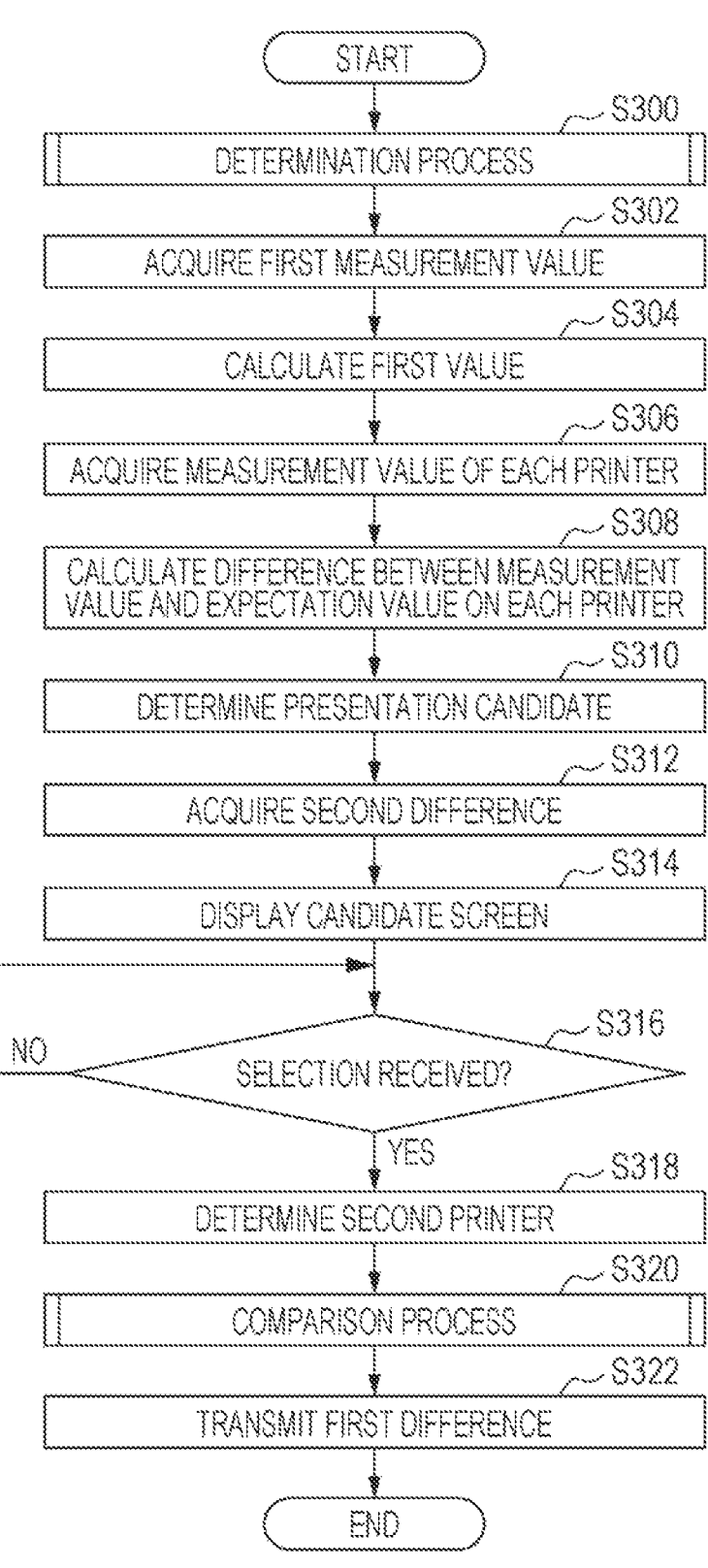
FIG. 7 is a flowchart illustrating a flow example of an information processing process in accordance with a first exemplary embodiment of the disclosure.

FIG. 7 is a flowchart illustrating a flow example of an information processing process performed by the information processing apparatus 10. The CPU 11 performs the information processing process by reading an information processing program from the ROM 12 or the storage 14 and loading the read information processing program onto the RAM 13. Referring to FIG. 7, the cooperation database is constructed through the memory process.

In step S300 in FIG. 7, the CPU 11 performs a determination process to determine the first printer 20A. The determination process is described below.

In step S302, the CPU 11 acquires a first measurement value. The first measurement value is a measurement value of a color of the first print product that the first printer 20A has printed in response to a first print instruction. Specifically, the CPU 11 retrieves from the cooperation database the measurement value associated with the first printer 20A determined in step S300.

In step S304, the CPU 11 calculates a first value that is a difference between the first measurement value acquired in step S302 and an expectation value of a color that is expected of the first print product and has been acquired in the determination process in step S300.

In step S306, the CPU 11 acquires measurement value of the color of the first print product of each printer 20 included in the printer group 30 from among all the printers 20 included in the information processing system 100. Specifically, the CPU 11 retrieves from the cooperation database the measurement value of the color of the first print product of each printer 20 included in the printer group 30.

In step S308, the CPU 11 calculates on each printer 20 included in the printer group 30 a difference between the measurement value of the color of the first print product and the expectation value of the color expected of the first print product.

In step S310, the CPU 11 determines a presentation candidate that is to be presented as a candidate for the second printer 20B. Specifically, the CPU 11 determines as the presentation candidate a printer having the difference calculated in step S308 equal to or lower than the first value calculated in step S304 from among the printers 20 included in the printer group 30.

In step S312, the CPU 11 acquires on each presentation candidate determined in step S310 a second difference that is a difference between the measurement value of the color of the first print product and the first measurement value. Specifically, the CPU 11 acquires a difference between the first printer 20A determined in step S300 and the presentation candidate.

In step S314, the CPU 11 displays on the display 16 a candidate screen following a predetermined format.

Referring to FIG. 8, the candidate screen of the exemplary embodiments displays a message that prompts a user to select from the presentation candidates one printer 20 to be determined as the second printer 20B. The candidate screen of the exemplary embodiments also displays the presentation candidates determined in step S310 in a sequential order of from smaller to larger value of the second difference acquired in step S312. In other words, the candidate screen of the exemplary embodiments does display, from among the printers 20 included in the printer group 30, any printer having the difference calculated in step S308 larger than the first value.

In step S316, the CPU 11 waits on standby until the selection of one of the printers 20 from the presentation candidates displayed on the candidate screen is received via the inputter 15. If the CPU 11 receives the selection of one printer from the presentation candidates displayed on the candidate screen (yes path in step S316), the CPU 11 proceeds to step S318.

In step S318, the CPU 11 determines the selected printer received in step S316 to be the second printer 20B.

In step S320, the CPU 11 performs a comparison process. The comparison process is described below.

In step S322, the CPU 11 transmits the first difference determined in the comparison process to the second printer 20B determined in step S318 and then ends the information processing process.

Figure 9:
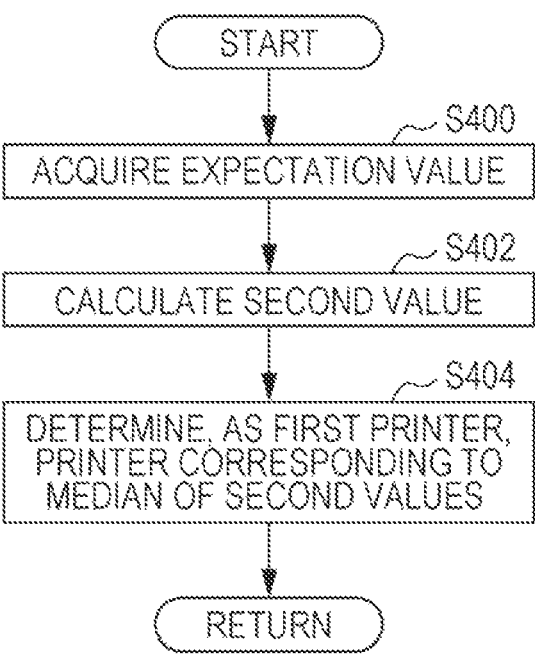
FIG. 9 is a flowchart illustrating a flow example of a determination process in accordance with the exemplary embodiments of the disclosure.

FIG. 9 is a flowchart illustrating a flow example of a determination process performed in the information processing process of the information processing apparatus 10.

In step S400 in FIG. 9, the CPU 11 acquires an expectation value of a color expected of the first print product. The printer 20 receives the expectation value together with the first print instruction. The expectation value is stored on the ROM 22 or storage 24 in the printer 20.

In step S402, the CPU 11 calculates on each of the printers 20 included in the information processing system 100 a second value between the measurement value of the color of the first print product and the expectation value. Specifically, the CPU 11 calculates a difference between each of the measurement values of the colors of the first print product of all the printers 20 acquired from the cooperation database and the expectation value acquired in step S400.

In step S404, the CPU 11 determines the printer 20 having the median of the second values calculated in step S402 as the first printer 20A and then ends the determination process.

Figure 10:
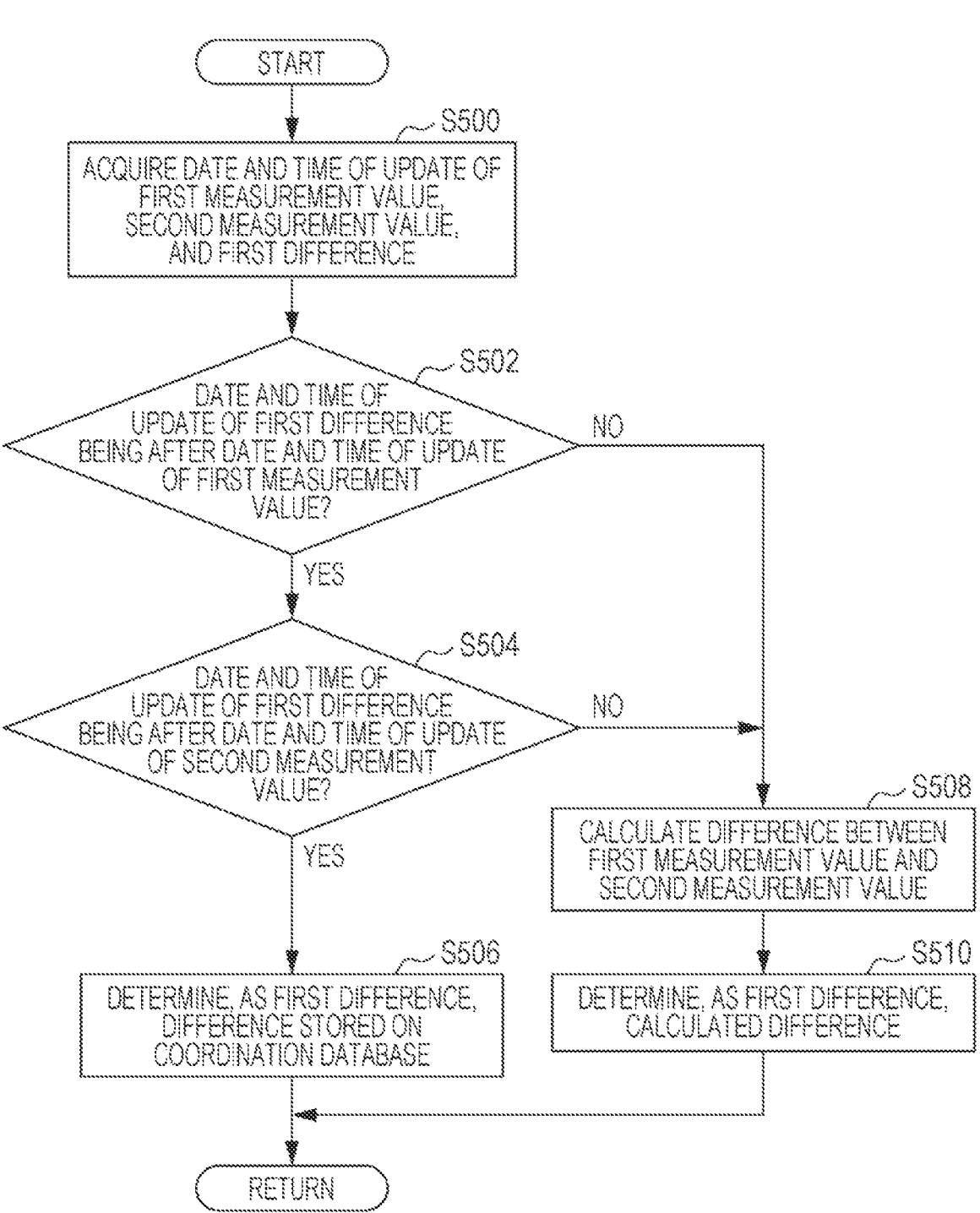
FIG. 10 is a flowchart illustrating a flow example of a comparison process in accordance with the exemplary embodiments of the disclosure.

FIG. 10 is a flowchart illustrating a flow example of the comparison process in the information processing process of the information processing apparatus 10.

In step S500 in FIG. 10, the CPU 11 acquires from the cooperation database the date and time of update of the first measurement value, second measurement value, and difference between the first printer 20A and second printer 20B. The second measurement value is the measurement value of the color of the first print product printed by the second printer 20B.

In step S502, the CPU 11 determines whether the date and time of update of the first difference is after the date and time of update of the first measurement value. If the date and time of update of the first difference is after the date and time of update of the first measurement value (yes path in step S502), the CPU 11 proceeds to step S504. If the date and time of update of the first difference is on or before the date and time of update of the first measurement value (no path in step S502), the CPU 11 proceeds to step S508.

In step S504, the CPU 11 determines whether the date and time of update of the second difference is after the date and time of update of the second measurement value. If the date and time of update of the first difference is after the date and time of update of the second measurement value (yes path in step S504), the CPU 11 proceeds to step S506. If the date and time of update of the first difference is on or before the date and time of update of the second measurement value (no path in step S504), the CPU 11 proceeds to step S508.

In step S506, the CPU 11 determines the difference between the first printer 20A and the second printer 20B and stored on the cooperation database as the first difference and then ends the comparison process.

In step S508, the CPU 11 calculates a difference between the first measurement value and the second measurement value stored on the cooperation database.

In step S510, the CPU 11 determines the difference calculated in step S508 as the first difference, causes the calculated difference and the date and time of execution in step S510 to overwrite corresponding items in the cooperation database, and then ends the comparison process.

Figure 11:
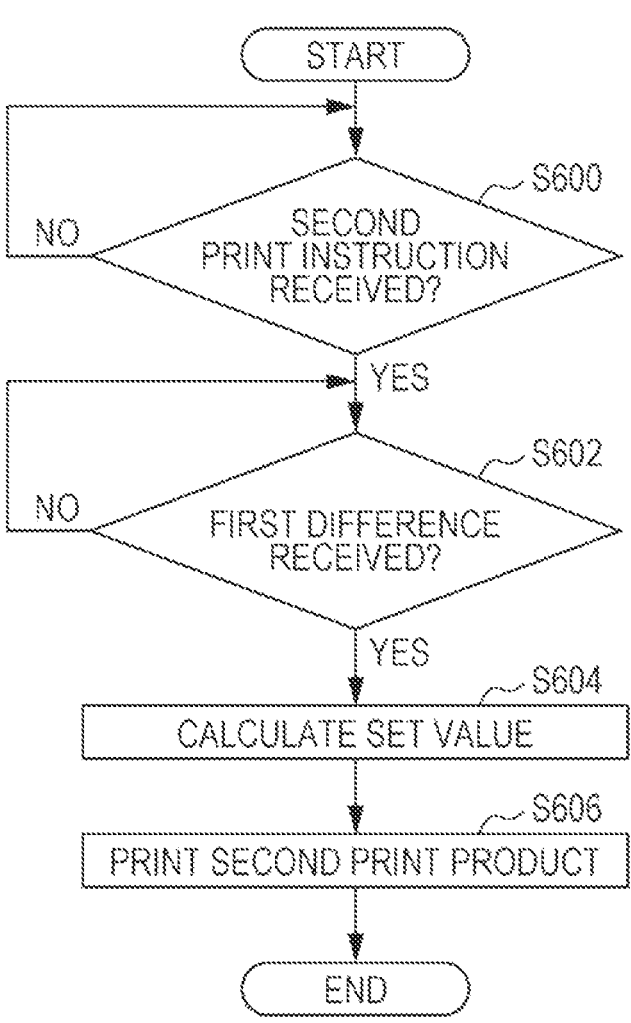
FIG. 11 is a flowchart illustrating a flow example of a printing process in accordance with the first exemplary embodiment.

FIG. 11 is a flowchart illustrating a flow example of a printing process performed by the second printer 20B. The CPU 21 in the second printer 20B performs the printing process by reading the print processing program from the ROM 22 or storage 24, loading the print processing program onto the RAM 23, and then executing the print processing program.

In step S600 in FIG. 11, the CPU 21 in the second printer 20B waits on standby until a second print instruction has been received. The second print instruction is different from the first print instruction and also provided to the first printer 20A. Upon receiving the second print instruction (yes path in step S600), the CPU 21 in the second printer 20B proceeds to step S602.

In step S602, the CPU 21 in the second printer 20B waits on standby until the first difference has been received from the information processing apparatus 10. Upon receiving the first difference from the information processing apparatus 10 (yes path in step S602), the CPU 21 in the second printer 20B proceeds to step S604.

In step S604, the CPU 21 in the second printer 20B calculates a set value in accordance with the first difference received from the information processing apparatus 10.

In step S606, the CPU 21 in the second printer 20B prints a second print product in response to a second instruction using the set value calculated in step S604 and then ends the printing process.

Second Exemplary Embodiment

According to the first exemplary embodiment, the CPU 21 in the second printer 20B calculates the set value in accordance with the first difference received from the information processing apparatus 10. According to a second exemplary embodiment, the CPU 11 in the information processing apparatus 10 calculates the set value from the first difference and transmits the set value to the second printer 20B.

The configurations of the information processing system 100, information processing apparatus 10, and printer 20 of the second exemplary embodiment are identical to the configurations of the first exemplary embodiment (see FIGS. 1 through 3) and the discussion thereof are omitted herein.

Figure 12:
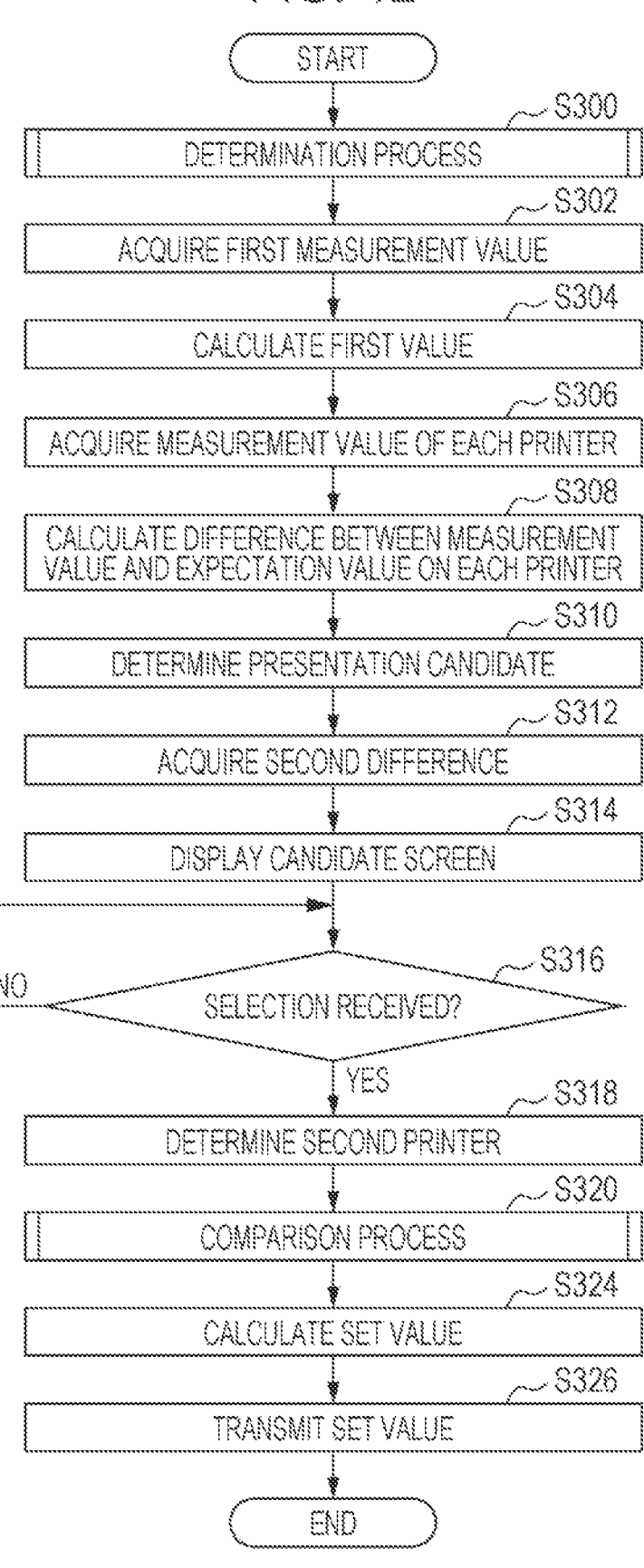
FIG. 12 is a flowchart illustrating a flow example of an information processing process in accordance with a second exemplary embodiment.

Referring to FIG. 12, the information processing process of the information processing apparatus 10 of the second exemplary embodiment is described below. In the information processing process in FIG. 12, operations identical to those in the information processing process in FIG. 7 are designated with the same step numbers and the discussion thereof is omitted herein.

The information processing process in FIG. 12 is different from the information processing process in FIG. 7 in that operations in steps S324 and S326 in FIG. 12 are performed instead of the operation in step S322.

In step S324 in FIG. 12, the CPU 11 in the information processing apparatus 10 calculates the set value in accordance with the first difference determined in the comparison process.

In step S326, the CPU 11 transmits the set value calculated in step S324 to the second printer 20B that is determined in step S318 and then ends the information processing process.

The printing process performed by the second printer 20B of the second exemplary embodiment is described with reference to FIG. 13. In the printing process in FIG. 13, steps performing the same operations as in the printing process in FIG. 11 are designated with the same step numbers and the discussion thereof is omitted herein.

Figure 13:
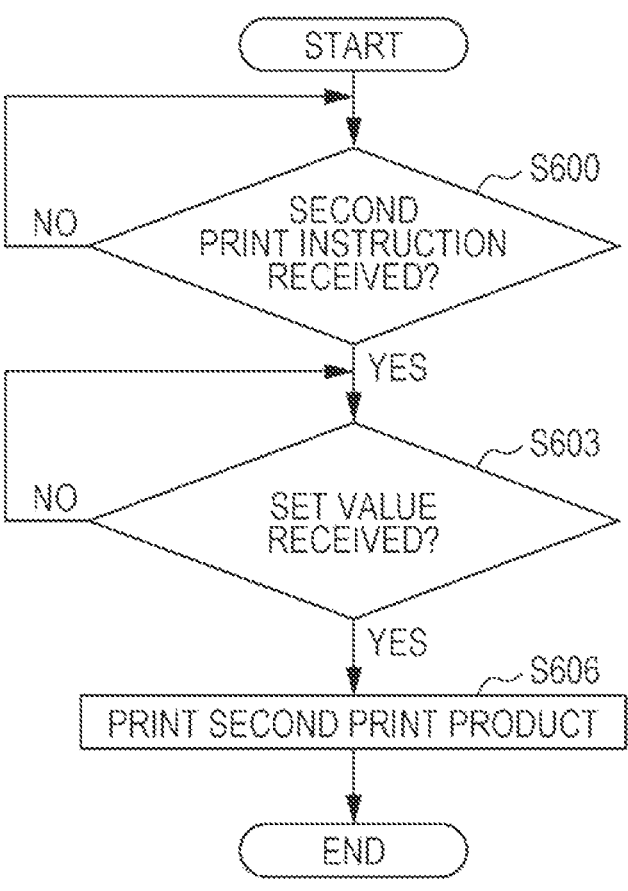
FIG. 13 is a flowchart illustrating a flow example of a printing process in accordance with the second exemplary embodiment.

The printing process in FIG. 13 is different from the printing process in FIG. 11 in that operation in step S603 in FIG. 13 is performed instead of the operations in steps S602 and S604.

In step S603 in FIG. 13, the CPU 21 in the second printer 20B waits on standby until the set value has been received from the information processing apparatus 10. In response to the reception of the set value from the information processing apparatus 10 (yes path in step S603), the CPU 21 in the second printer 20B proceeds to step S606.

The flows of the measurement process, determination process, and comparison process of the second exemplary embodiment are respectively identical to the flows of the measurement process, determination process, and comparison process of the first exemplary embodiment and the discussion thereof is omitted herein.

Each of the processes may be implemented by a dedicated hardware circuit. In such a case, the process may be implemented by one or more hardware circuits.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

Programs causing the information processing apparatus 10 and printer 20 to function may be provided in a recorded form on a computer readable medium, such as a universal serial bus (USB) memory or compact disc read-only memory (CD-ROM), or may be provided online via a network, such as the Internet. The program recorded on the computer readable medium may be transferred to a memory or storage for storage. The program may be provided as an application program or may be provided by embedding the program into the software program of the information processing apparatus 10 and the printer 20.

The disclosure is not limited to the exemplary embodiments described above and a variety of changes may be performed to the exemplary embodiments without departing from the scope of the disclosure.

The CPU 11 in the information processing apparatus 10 may display the presentation candidates in the order of larger to smaller second differences. The CPU 11 in the information processing apparatus 10 may present the presentation candidates by sound.

The CPU 11 in the information processing apparatus 10 may determine the printers 20 included in the printer group 30 as presentation candidates regardless of whether the difference between the measurement value of the color of the first print product and the expectation value is larger than the first value.

The CPU 11 in the information processing apparatus 10 may determine as the first printer a printer corresponding to a second value that is a mean value or mode of the second values and is neither a maximum value nor a minimum value of the second values.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An information processing system including:
an information processing apparatus; and
multiple printers,
wherein the plurality of printer include:
    a first printer; and
    a printer group including at least one printer, and
wherein the information processing apparatus includes:
    a processor configured to:
        acquire as a first measurement value a measurement value of color of a first print product that the first printer has printed in response to a first print instruction;
        acquire as a second measurement value a measurement value of color of the first print product that a second printer included in the printer group has printed in response to the first print instruction;
        transmit to the second printer a first difference between the first measurement value and the second measurement value, and
    wherein using a set value calculated in accordance with the first difference, the second printer prints a second print product in response to a second print instruction that is also provided to the first printer.

(((2)))
An information processing system including:
an information processing apparatus; and
multiple printers,
wherein the plurality of printers include:
    a first printer; and
    a printer group including at least one printer, and
wherein the information processing apparatus includes:
    a processor configured to:
        acquire as a first measurement value a measurement value of a color of a first print product that the first printer has printed in response to a first print instruction;
        acquire as a second measurement value a measurement value of a color of the first print product that a second printer included in the printer group has printed in response to the first print instruction;
        calculate, in response to a first difference value between the first measurement value and the second measurement value, a set value that is to be used by the second printer; and
        transmit the set value to the second printer, and
    wherein using the set value, the second printer prints a second print product in response
    to a second print instruction that is also provided to the first printer.

(((3)))
In the information processing system according to one of (((1))) and (((2))), the processor is configured to:

acquire the measurement value of the color of the first print product from each of the printers in the printer group;

indicate the printers included in the printer groups, as a candidate for the second printer, in an order of from smaller to larger value of a second difference between the measurement value of the color of the first print product on each of the printers included in the printer group and the first measurement value; and determine one of the indicated printers as the second printer.

(((4)))

In the information processing system according to (((3))), the processor is configured to:

calculate as a first value a difference between the first measurement value and an expectation value of the color expected of the first print product;

calculate a difference between the measurement value of the color of the first print product on each of the printers in the printer group and the expectation value; and indicate, as a candidate for the second printer from among the printers included in the printer group, a printer having the difference, between the measurement value of the color of the first print product and the expectation value, equal to or lower than the first value and not indicate as the candidate for the second printer a printer having the difference, between the measurement value of the color of the first print product and the expectation value, higher than the first value.

(((5)))

In the information processing system according to one of (((1))) through (((4))), the processor is configured to:

calculate, as a second value on each of the printers, a difference between the measurement value of the color of the first print product and an expectation value of the color expected of the first print product; and determine as the first printer a printer having the second value that is neither a maximum value of the second values nor a minimum value of the second values.

(((6)))

In the information processing system according to (((5))), the processor is configured to determine as the first printer a printer having a median of the second values.

(((7)))

An information processing apparatus including:

a processor configured to:

acquire as a first measurement value a measurement value of a color of a first print product that a first printer has printed in response to a first print instruction;

acquire as a second measurement value a measurement value of a color of the first print product that a second printer has printed in response to the first print instruction; and transmit to the second printer a first difference between the first measurement value and the second measurement value.

(((8)))

An information processing program causing a computer to perform a process, the process including:

acquiring as a first measurement value a measurement value of a color of a first print product that a first printer has printed in response to a first print instruction;

acquiring as a second measurement value a measurement value of a color of the first print product that a second printer has printed in response to the first print instruction; and transmitting to the second printer a first difference between the first measurement value and the second measurement value.

What is claimed is:

1. An information processing system comprising:
an information processing apparatus; and
a plurality of printers,
wherein the plurality of printers include:
a first printer; and
a printer group including at least one printer,
wherein the information processing apparatus includes:
a processor configured to:
acquire as a first measurement value a measurement value of a color of a first print product that the first printer has printed in response to a first print instruction;
acquire as a second measurement value a measurement value of a color of the first print product that a second printer included in the printer group has printed in response to the first print instruction;
acquire the measurement value of the color of the first print product from each of the printers in the printer group;
indicate the printers included in the printer group, as a candidate for the second printer, in an order of from smaller to larger value of a second difference between the measurement value of the color of the first print product on each of the printers included in the printer group and the first measurement value;
determine one of the indicated printers as the second printer; and
transmit to the second printer a first difference between the first measurement value and the second measurement value, and
wherein using a set value calculated in accordance with the first difference, the second printer prints a second print product in response to a second print instruction that is also provided to the first printer.

2. The information processing system according to claim 1, wherein the processor is configured to:
calculate as a first value a difference between the first measurement value and an expectation value of the color expected of the first print product;
calculate a difference between the measurement value of the color of the first print product on each of the printers in the printer group and the expectation value; and
indicate, as a candidate for the second printer from among the printers included in the printer group, a printer having the difference, between the measurement value of the color of the first print product and the expectation value, equal to or lower than the first value and not indicate as the candidate for the second printer a printer having the difference, between the measurement value of the color of the first print product and the expectation value, higher than the first value.

3. The information processing system according to claim 1, wherein the processor is configured to:
calculate, as a second value on each of the printers, a difference between the measurement value of the color of the first print product and an expectation value of the color expected of the first print product; and
determine as the first printer a printer having the second value that is neither a maximum value of the second values nor a minimum value of the second values.

4. The information processing system according to claim 3, wherein the processor is configured to determine as the first printer a printer having a median of the second values.

5. An information processing system comprising:

an information processing apparatus; and a plurality of printers, wherein the plurality of printers include:

a first printer; and a printer group including at least one printer, wherein the information processing apparatus includes:

a processor configured to:

acquire as a first measurement value a measurement value of a color of a first print product that the first printer has printed in response to a first print instruction;

acquire as a second measurement value a measurement value of a color of the first print product that a second printer included in the printer group has printed in response to the first print instruction; and calculate, in response to a first difference value between the first measurement value and the second measurement value, a set value that is to be used by the second printer;

acquire the measurement value of the color of the first print product from each of the printers in the printer group;

indicate the printers included in the printer group, as a candidate for the second printer, in an order of from smaller to larger value of a second difference between the measurement value of the color of the first print product on each of the printers included in the printer group and the first measurement value;

determine one of the indicated printers as the second printer; and transmit the set value to the second printer, and wherein using the set value, the second printer prints a second print product in response to a second print instruction that is also provided to the first printer.

6. The information processing system according to claim 2, wherein the processor is configured to:

calculate as a first value a difference between the first measurement value and an expectation value of the color expected of the first print product;

calculate a difference between the measurement value of the color of the first print product on each of the printers in the printer group and the expectation value; and indicate, as a candidate for the second printer from among the printers included in the printer group, a printer having the difference, between the measurement value of the color of the first print product and the expectation value, equal to or lower than the first value and not indicate as the candidate for the second printer a printer having the difference, between the measurement value of the color of the first print product and the expectation value, higher than the first value.

7. The information processing system according to claim 5, wherein the processor is configured to:

calculate, as a second value on each of the printers, a difference between the measurement value of the color of the first print product and an expectation value of the color expected of the first print product; and determine as the first printer a printer having the second value that is neither a maximum value of the second values nor a minimum value of the second values.

8. The information processing system according to claim 7, wherein the processor is configured to determine as the first printer a printer having a median of the second values.

9. An information processing apparatus comprising:

a processor configured to:

acquire as a first measurement value a measurement value of a color of a first print product that a first printer has printed in response to a first print instruction;

acquire as a second measurement value a measurement value of a color of the first print product that a second printer has printed in response to the first print instruction;

acquire a measurement value of the color of the first print product from each of a plurality of printers in a printer group;

indicate the printers included in the printer group, as a candidate for the second printer in an order of from smaller to larger value of a second difference between the measurement value of the color of the first print product on each of the printers included in the printer group and the first measurement value;

determine one of the indicated printers as the second printer; and transmit to the second printer a first difference between the first measurement value and the second measurement value or a set value that is calculated in accordance with the first difference and is to be used by the second printer.

* * * * *